(12) United States Patent
Leslie et al.

(10) Patent No.: US 10,502,059 B2
(45) Date of Patent: Dec. 10, 2019

(54) ALIGNMENT TIE ROD DEVICE AND METHOD OF UTILIZATION

(71) Applicant: United Technologies Corporation, Hartford, CT (US)

(72) Inventors: Nicholas R. Leslie, South Berwick, ME (US); Matthew S. Verbiscus, Dover, NH (US); Mark J. Rogers, Kennebunk, ME (US); Eric A. Kuehne, Lyman, ME (US); Reese Kincaid, Lee, NH (US)

(73) Assignee: United Technologies Corporation, Farmington, CT (US)

( * ) Notice: Subject to any disclaimer, the term of this patent is extended or adjusted under 35 U.S.C. 154(b) by 863 days.

(21) Appl. No.: 14/611,842

(22) Filed: Feb. 2, 2015

(65) Prior Publication Data
US 2018/0066697 A1    Mar. 8, 2018

(51) Int. Cl.
| | |
|---|---|
| *F16B 35/04* | (2006.01) |
| *F01D 5/06* | (2006.01) |
| *F16B 33/00* | (2006.01) |
| *F16B 5/02* | (2006.01) |

(52) U.S. Cl.
CPC .............. *F01D 5/06* (2013.01); *F01D 5/066* (2013.01); *F16B 5/0275* (2013.01); *F16B 33/002* (2013.01); *F16B 35/048* (2013.01); *F16B 2200/40* (2018.08); *F16B 2200/506* (2018.08)

(58) Field of Classification Search
CPC ...... F16B 33/002; F16B 35/048; F16B 35/06; F16B 5/0275; F16B 2200/40; F16B 2200/506; Y10T 403/1691; Y10T 403/4674; Y10T 403/645; F01D 5/066; F01D 5/06; F01D 25/243; F01D 25/246; F05D 2220/32; F15D 2260/30
USPC ......................................... 411/166, 169, 389
See application file for complete search history.

(56) References Cited

U.S. PATENT DOCUMENTS

| | | | | |
|---|---|---|---|---|
| 3,141,686 A | * | 7/1964 | Smith | ..................... F16L 23/02 |
| | | | | 277/608 |
| 3,784,316 A | * | 1/1974 | Bittern | ................ B23B 51/0473 |
| | | | | 144/20 |
| 3,936,222 A | * | 2/1976 | Asplund | ................ F01D 5/3015 |
| | | | | 416/193 A |
| 4,139,315 A | * | 2/1979 | Levy | ....................... F16B 39/02 |
| | | | | 403/19 |

(Continued)

FOREIGN PATENT DOCUMENTS

FR          3002585 A1 *  8/2014  ............. F01D 5/027

*Primary Examiner* — Matthew R McMahon
(74) *Attorney, Agent, or Firm* — O'Shea Getz P.C.

(57) ABSTRACT

An alignment tie rod device for connecting multiple components from generally opposite directions includes a shaft extending along a centerline. A first structure of the device includes opposing first and second rims and a base portion spanning between the rims. The base portion and rims define a channel that extends substantially normal to the centerline. A hole in the base portion is centered between the rims and communicates through the base portion for receipt of the shaft. An anti-rotation feature disposed operably within the channel is rigidly engaged to and projects radially outward from the shaft in diametrically opposed direction. The feature has diametrically opposite, arcuate, edges each having a radius of curvature that is substantially greater than a distance measured between the rims.

7 Claims, 4 Drawing Sheets

(56) References Cited

U.S. PATENT DOCUMENTS

| | | | | |
|---|---|---|---|---|
| 4,620,732 A | * | 11/1986 | Marshall | F16L 23/032 |
| | | | | 285/368 |
| 4,688,378 A | * | 8/1987 | Harris | F01D 11/005 |
| | | | | 277/640 |
| 4,844,694 A | * | 7/1989 | Naudet | F01D 5/066 |
| | | | | 415/199.5 |
| 5,232,323 A | * | 8/1993 | Baehre | F16B 33/002 |
| | | | | 411/109 |
| 5,848,874 A | * | 12/1998 | Heumann | F01D 9/042 |
| | | | | 411/24 |
| 6,499,957 B1 | * | 12/2002 | Klingels | F01D 5/066 |
| | | | | 416/198 A |
| 6,641,326 B2 | * | 11/2003 | Schilling | F16B 5/0275 |
| | | | | 403/337 |
| 6,761,034 B2 | | 7/2004 | Niday et al. | |
| 7,491,031 B2 | * | 2/2009 | Brault | F01D 5/027 |
| | | | | 416/119 |
| 7,814,735 B2 | * | 10/2010 | Neudorf | A01D 34/733 |
| | | | | 411/399 |
| 7,922,433 B2 | * | 4/2011 | Ricciardo | F16L 339/10 |
| | | | | 411/119 |
| 8,043,062 B2 | * | 10/2011 | Ichiryu | F04D 27/0292 |
| | | | | 416/198 A |
| 8,142,150 B2 | | 3/2012 | Frick et al. | |
| 8,360,714 B2 | | 1/2013 | Otto et al. | |
| 8,668,463 B2 | | 3/2014 | Yilmaz | |
| 9,909,424 B2 | * | 3/2018 | Douady | F01D 5/066 |
| 2004/0240992 A1 | | 12/2004 | Bongrand et al. | |
| 2011/0129336 A1 | | 6/2011 | Bonneau et al. | |
| 2013/0042630 A1 | | 2/2013 | Muldoon | |
| 2013/0129501 A1 | | 5/2013 | Scothern | |
| 2013/0170958 A1 | | 7/2013 | Otto et al. | |
| 2013/0202450 A1 | | 8/2013 | Ivakitch et al. | |
| 2013/0291544 A1 | | 11/2013 | Eastwood et al. | |
| 2014/0093370 A1 | | 4/2014 | Mattia et al. | |
| 2014/0174088 A1 | | 6/2014 | Ruberte Sanches et al. | |
| 2014/0286770 A1 | * | 9/2014 | Henry | F01D 5/026 |
| | | | | 415/213.1 |
| 2016/0025013 A1 | | 1/2016 | Miller et al. | |

* cited by examiner

ALIGNMENT TIE ROD DEVICE AND METHOD OF UTILIZATION

STATEMENT REGARDING FEDERALLY SPONSORED RESEARCH OR DEVELOPMENT

This disclosure was made with Government support under FA8650-09-D-2923-0021 awarded by The United States Air Force. The Government has certain rights in this disclosure.

BACKGROUND

The present disclosure relates to a fastener and more particularly to an alignment tie rod device that may be used in a gas turbine engine.

A wide variety of fasteners are used throughout industry including the gas turbine engine industry as one, non-limiting, example. Many fasteners are shaped and operate in unique ways to meet a particular application and restrictions dictated by the surrounding environment, such as confined space or limited access. In addition, some fasteners may function to engage multiple components, align multiple components or a combination of both. Many such fasteners apply threaded nuts to one or both ends that when tightened exert a torque upon a shaft of the fastening device. Moreover, it may be desired that when torqueing a nut to one end of the shaft, the rotational torque force should not influence or effect the opposite end. There remains a need to provide fastening devices that can be torqued at one end without influencing the other and providing such a device with an anti-rotation feature that is robust and will not deform, mis-align or harm the components being attached.

SUMMARY

An alignment tie rod device according to one, non-limiting, embodiment of the present disclosure includes a shaft extending along a centerline; a first structure including opposing first and second rims and a base portion spanning between the first and second rims with the base portion and the rims defining a channel in the first structure extending substantially normal to the centerline, wherein a hole in the base portion communicates with the channel and is spaced from and centered between the first and second rims for receipt of the shaft, and the rims are spaced apart by a rim distance; and an anti-rotation feature rigidly engaged to the shaft and projecting radially outward in substantially diametrically opposed directions, the anti-rotation feature having diametrically opposite arcuate first and second edges each having a radius of curvature, and wherein a ratio of the rim distance over the radius of curvature is equal to or less than 0.28.

Additionally to the foregoing embodiment, the respective radius of curvatures for the first and second edges are substantially equivalent.

In the alternative or additionally thereto, in the foregoing embodiment, the shaft has opposite first and second end portions and the anti-rotation feature is axially disposed between the end portions.

In the alternative or additionally thereto, in the foregoing embodiment, the anti-rotation feature has a radial width measured between the first and second edges and through the centerline that is substantially equal to the rim distance.

In the alternative or additionally thereto, in the foregoing embodiment, a depth of the channel is greater than an axial width of the anti-rotation feature.

In the alternative or additionally thereto, in the foregoing embodiment, the first and second edges have a chamfer.

In the alternative or additionally thereto, in the foregoing embodiment, the shaft has a diameter, and a ratio of the diameter over the radial width is about 0.54.

In the alternative or additionally thereto, in the foregoing embodiment, the first structure and the anti-rotation feature are made of the same material.

In the alternative or additionally thereto, in the foregoing embodiment, the alignment tie rod device includes a second structure including a side in biased contact with the first and second rims and at least in-part exposed to the channel with a hole in the second structure communicating through the side for receipt of the shaft.

In the alternative or additionally thereto, in the foregoing embodiment, the alignment tie rod device includes a second structure including a side in biased contact with the first and second rims and at least in-part exposed to the channel with a hole in the second structure communicating through the side for receipt of the shaft; a first nut threadably engaged to a first end portion of the shaft that projects outward from the second structure opposite the first structure; a bushing disposed about the shaft and in axially biased contact with the first structure opposite the second structure; and a second nut threadably engaged to a second end portion of the shaft opposite the first end portion and that projects outward from the bushing.

In the alternative or additionally thereto, in the foregoing embodiment, the alignment tie rod device includes a third structure with an aperture through which the bushing and the shaft extend, and wherein the bushing has a radially outward projecting flange with the third structure located axially between the flange and the first structure, the third structure being in biased contact with the flange, and the second nut being in contact with the flange opposite the third structure.

A gas turbine engine according to another, non-limiting, embodiment of the present disclosure includes a shroud segment extending circumferentially about an engine axis and including a tab projecting radially outward, wherein the tab includes opposing first and second rims extending circumferentially and a base portion spanning radially between the first and second rims with the base portion and the rims defining a channel in the tab; a case orientated about the engine axis and spaced radially outward from the shroud segment, the case including an annular flange projecting radially inward and in biased contact with the first and second rims and at least in-part exposed to the channel; a shaft extending along a centerline disposed substantially parallel to the engine axis, and wherein the shaft extends through a first hole in the flange and a second hole in the base portion and centered between the first and second rims; and an anti-rotation feature rigidly engaged to the shaft and projecting radially outward in substantially diametrically opposed directions with respect to the centerline, the anti-rotation feature having diametrically opposite arcuate first and second edges each having a substantially equivalent radius of curvature measured through the centerline.

Additionally to the foregoing embodiment, the rims are radially spaced apart by a rim distance and a ratio of the rim distance over the radius of curvature is equal to or less than 0.28.

In the alternative or additionally thereto, in the foregoing embodiment, the anti-rotation feature has a radial width measured between the first and second edges and through the centerline that is substantially equal to the rim distance, and wherein the shaft has a diameter, and a ratio of the diameter over the radial width is about 0.54.

In the alternative or additionally thereto, in the foregoing embodiment, the engine includes a first nut threadably engaged to a first end portion of the shaft that projects outward from the flange opposite the tab; a bushing disposed about the shaft and in axially biased contact with the tab opposite the flange; and a second nut threadably engaged to a second end portion of the shaft opposite the first end portion and that projects outward from the bushing, and wherein a depth of the channel is greater than an axial width of the anti-rotation feature.

In the alternative or additionally thereto, in the foregoing embodiment, the engine includes a heat shield including an aperture through which the bushing and the shaft extend.

In the alternative or additionally thereto, in the foregoing embodiment, the bushing has a radially outward projecting bushing flange with the heat shield located axially between the bushing flange and the tab, the heat shield being in biased contact with the bushing flange, and the second nut being in contact with the bushing flange opposite the flange of the casing.

In the alternative or additionally thereto, in the foregoing embodiment, the tab and the anti-rotation feature are made of Inconel 718.

A method of utilizing an alignment tie rod device according to another, non-limiting, embodiment of the present disclosure includes the steps of inserting a first end portion of a shaft through a hole in a first structure and until an anti-rotation feature rigidly engaged to the shaft is located in a channel in the first structure; placing a bushing about the first end; securing a threaded first nut to the first end portion until the bushing is biased against the first structure; inserting an opposite second end portion of the shaft through a hole in a second structure; and securing a threaded second nut to the second end portion until the second structure is biased against the first structure with the anti-rotation feature disposed between the first and second structures, and wherein diametrically opposed, arcuate, first and second edges of the anti-rotation feature contact respective opposing rims of the first structure as the second nut is secured.

The foregoing features and elements may be combined in various combination without exclusivity, unless expressly indicated otherwise. These features and elements as well as the operation thereof will become more apparent in light of the following description and the accompanying drawings. It should be understood, however, the following description and figures are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

Figure 1:
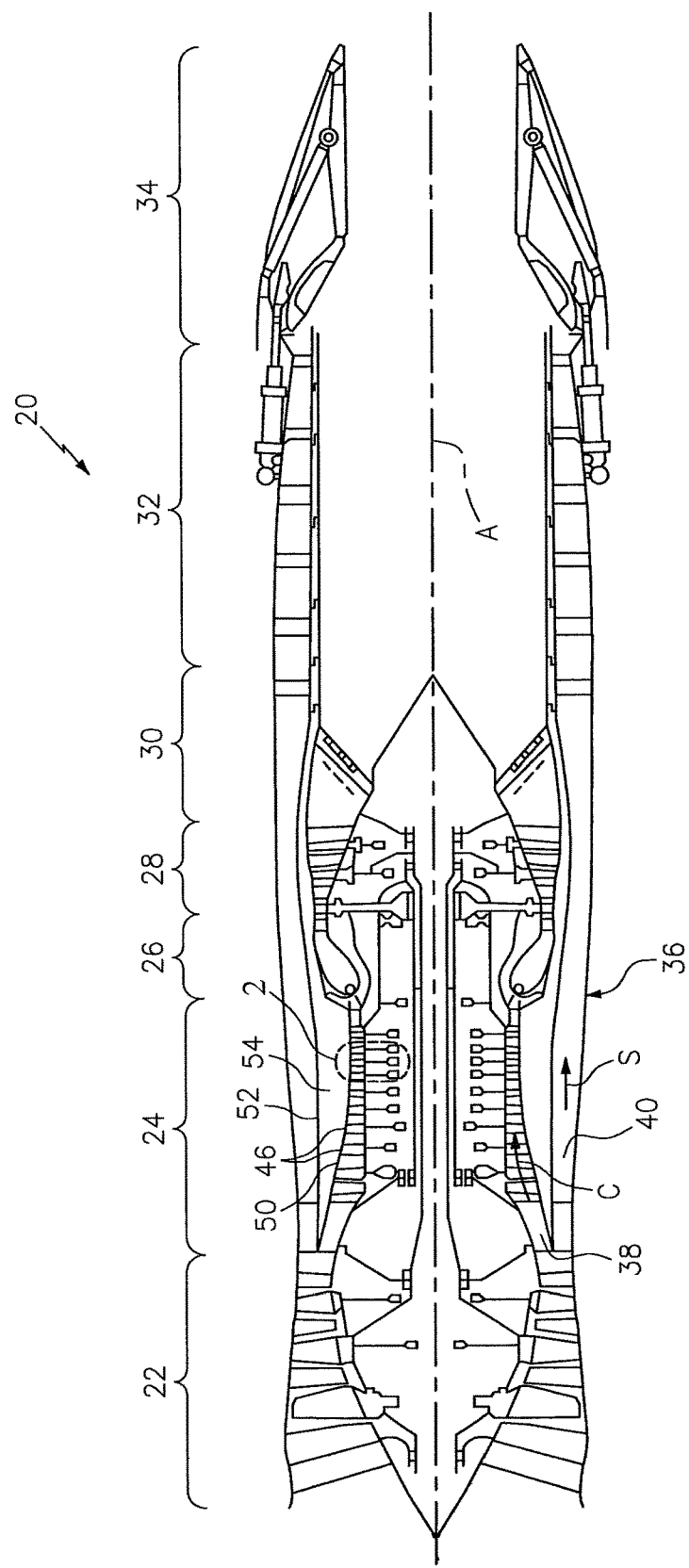
FIG. 1 is a schematic cross section of a gas turbine engine.

Referring to FIG. 1, a gas turbine engine 20 is disclosed as a two-spool low-bypass augmented turbofan that generally incorporates a fan section 22, a compressor section 24, a combustor section 26, a turbine section 28, an augmenter section 30, an exhaust duct 32, and a nozzle system 34 along a central engine axis A. Although depicted as an augmented low bypass turbofan in the disclosed, non-limiting, embodiment, it is understood that the concepts of the present disclosure are applicable to other gas turbine engines including non-augmented engines, geared architecture engines, land-based turbine engines, direct-drive turbofans, turboshaft, multi-stream variable cycle adaptive engines and other engine architectures. Variable cycle gas turbine engines power aircraft over a range of operating conditions and essentially alters a bypass ratio during flight to achieve countervailing objectives such as high specific thrust for high-energy maneuvers, yet optimizes fuel efficiency for cruise and loiter operational modes.

As illustrated, the fan section 22 is a multi-staged fan section that may generally function as a low pressure compressor and the compressor section 24 generally functions as a high pressure compressor. In alternative designs such as a high bypass ratio engine (not shown), the fan section may be single staged followed by a compressor section that has both low and high pressure stages. In the present illustration, airflow into the engine 20 may generally be produced by the fan section 22, then divided between a core airflow C and a secondary airflow S. An engine case structure 36 generally functions as an exoskeleton to support both stationary and rotational hardware of the engine and define, at least in-part, a core airflow path 38 for routing of the core airflow C and at least one secondary airflow path 40 for routing of the secondary airflow S.

The core airflow C enters the compressor section 24 at a low pressure produced by the multi-staged fan section 22 and exits at a high pressure. The high pressure core airflow C then passes through the combustor section 26, the turbine section 28, then the augmentor section 30 where fuel may be selectively injected and burned to generate additional thrust through the nozzle system 34. The secondary airflow S may be generally sourced from the multi-staged fan section 22 at the low pressure and may be utilized for a variety of purposes including, for example, cooling and pressurization, and ultimately, at least partially, injected into the core flowpath 38 adjacent to the exhaust duct section 32 and the nozzle system 34. It is contemplated and understood that the secondary airflow S may be any airflow that is not the core airflow C, and additional airflow streams typical of variable cycle engine architectures (for example) may be provided as part of the secondary airflow S.

The exhaust duct section 32 may be circular in cross section as typical of an axisymmetric augmented low bypass turbofan, or may be non-axisymmetric in cross section to include, but not limited to, a serpentine shape to block direct view to the turbine section 28. In addition to the various cross sections and the various longitudinal shapes, the exhaust duct section 32 terminates with the nozzle system 34 such as a Convergent/Divergent (C/D) nozzle system, an non-axisymmetric two-dimensional (2D) C/D vectorable nozzle system, a flattened slot nozzle of high aspect ratio or other nozzle arrangement.

Figure 2:
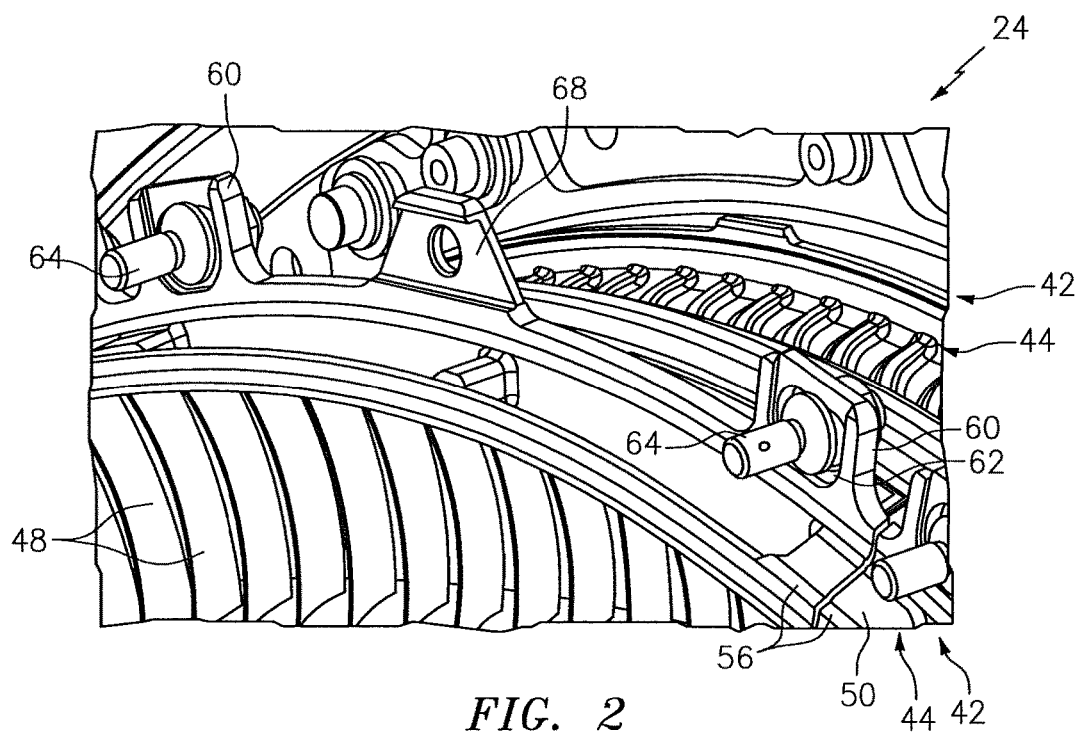
FIG. 2 is a partial perspective view of a compressor section of the engine with components removed to show internal detail.

Referring to FIGS. 1 and 2, the compressor section 24 includes a plurality of axially distributed stages 42 with each stage including a forward stator assembly 44 and an axially adjacent, and aft, rotor assembly 46 (see FIG. 1). Each assembly 44, 46 has a plurality airfoils 48 that extend radially and are spaced circumferentially from one another. The airfoils 48 are constructed and arranged to work the core airflow C as is commonly known in the turbine arts. The airfoils 48 of the stator assembly 44 may project radially between and are engaged to inner and outer endwalls or shrouds 50 (only the outer shroud is illustrated). The outer and inner shrouds 50 of each stage 42, together, define the annular core flowpath 38 for the flow of airflow C.

Figure 3:
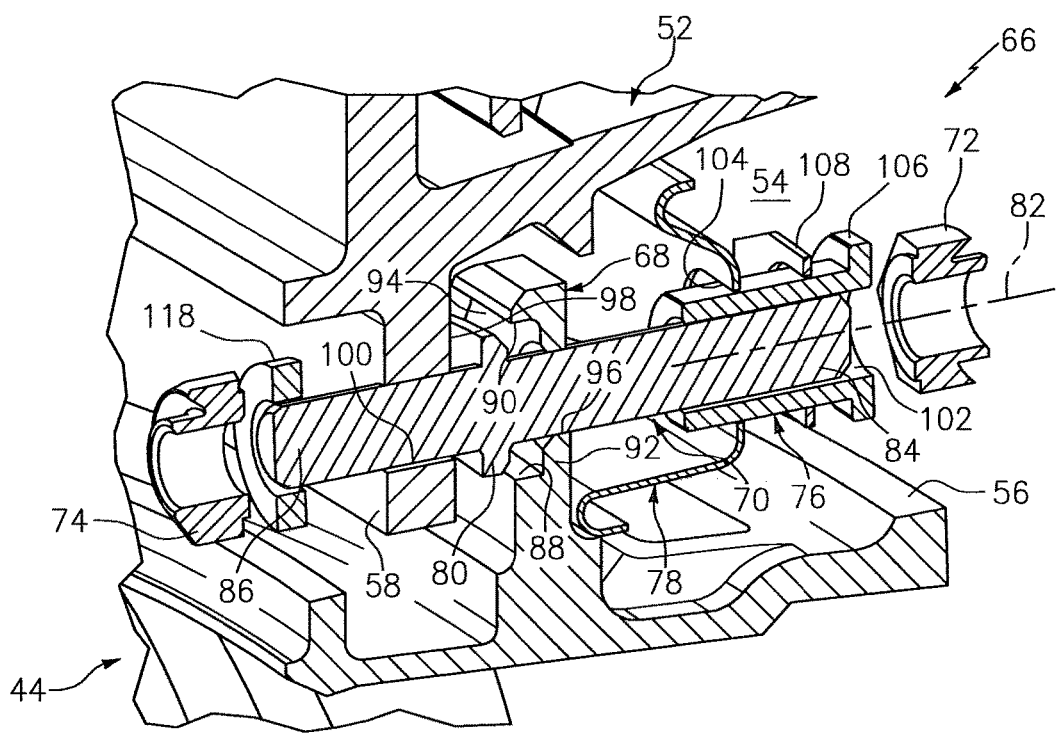
FIG. 3 is a partial cross-sectional, perspective, exploded view of an alignment tie rod device according to one, non-limiting embodiment of the present disclosure.

Referring to FIGS. 1 and 3, an outer or ring case 52 of the compressor section 24 is generally spaced radially outward from the outer shrouds 50 with an annular cooling flowpath 54 defined, at least in-part, therebetween for the flow of compressor bleed air that may be used to cool the turbine section 28. The ring case 52 may also be used to support and align the stator assembly 44 of any one or more stages 42. The stator assembly 44 may generally be divided into a plurality of circumferentially distributed segments each having a plurality of airfoils extending between respective, circumferentially extending, segments 56 of the inner and outer shrouds 50.

Figure 4:
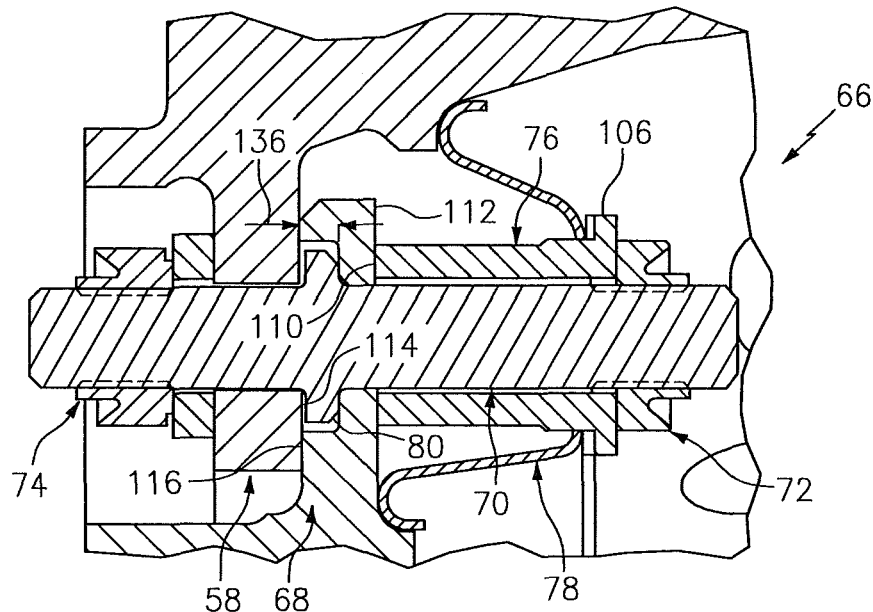
FIG. 4 is a cross section of the tie rod device.

Referring to FIGS. 2 through 4, the ring case 52 may include a circumferentially continuous, annular, flange 58 that projects radially inward for generally securing each outer shroud segment 56 to the case at multiple, circumferentially spaced, locations (three illustrated in FIG. 2). One such location may be circumferentially centered to the shroud segment 56, and two flanking locations are circumferentially spaced from the centered location and generally proximate to the respective ends of the segment 56. Engagement of the shroud segment 56 to the case flange 58 at the flanking locations may be facilitated by a tab 60 projecting radially outward from the shroud segment 56. The tabs 60 for both flanking locations may include an aperture 62 for receipt of a threaded fastener 64 that also extends through a hole (not shown) in the flange 58. Each aperture 62 may be circumferentially elongated to allow for circumferential thermal expansion of the shroud segment 56.

Unlike the flanking locations, the centered location may generally be an alignment tie rod device 66 that generally does not allow for circumferential thermal displacement of the shroud segment 56. That is, because the tie rod device 66 is centered upon the shroud segment 56, any thermal expansion is equivalent in either circumferential direction, and thus the tie rod device 66 aligns the shroud segment 56 circumferentially; and like the flanking locations, assists in aligning the shroud segment both radially and axially with respect to the ring case 52 and engine axis A.

The tie rod device 66 may include the flange 58, a tab 68, a shaft 70, two threaded nuts 72, 74, a bushing 76, a heat shield 78, and an anti-rotation feature 80. When assembled, the shaft 70 extends along a centerline 82 that may be substantially parallel to and spaced radially outward from the engine axis A. The shaft 70 has and may extend between an aft end portion 84 (i.e. downstream) and a leading end portion 86 (i.e. upstream). Both end portions 84, 86 may be threaded for threaded engagement of the respective nuts 72, 74. The anti-rotation feature 80 projects radially outward from the shaft 70 axially between the end portions 84, 86. The anti-rotation feature 80 and the shaft 70 may be one unitary piece.

The tab 68 projects rigidly outward from the shroud segment 56 and may be cast, forged, and/or machined as one unitary piece to the segment. The tab 68 has two opposing rims 88, 90 and a base portion 92 that spans therebetween. The rims 88, 90 generally extend circumferentially with respect to the engine axis A and may generally be normal to the centerline 82 of the shaft 70. Boundaries of a channel 94 in the tab 68 are generally defined by the base portion 92 and the rims 88, 90. A round hole 96 extends through the base portion 92, communicates with the channel 94 and is centered between the rims 88, 90 for receipt of the aft end portion 84 of the shaft 70. A round hole 100 is in the flange 58 for receipt of the leading end portion 86 of the shaft 70. The anti-rotation feature 80 is located in the channel 94 and generally between the flange 58 and the tab 68.

A center bore 102 is defined by and extends axially through the bushing 76 for receipt of the aft end portion 84 of the shaft 70. The bushing 76 and the aft end portion 84 extend axially through an aperture 104 in the heat shield 78. The bushing 78 may include a circumferentially continuous flange 106 projecting radially outward from an aft end and located aft of the heat shield and upstream of the nut 72. The heat shield 78 may be generally annular in shape and covers the upstream flange 58, tabs 60, 68, fasteners 64, a substantial portion of the shaft 70 and other components for thermal protection. The aperture 104 in the heat shield 78 may be elongated in a circumferential direction to facilitate circumferential thermal expansion. A washer or cover 108 may be located between the heat shield and the bushing flange 106 for covering the elongated aperture 104.

Figure 5:
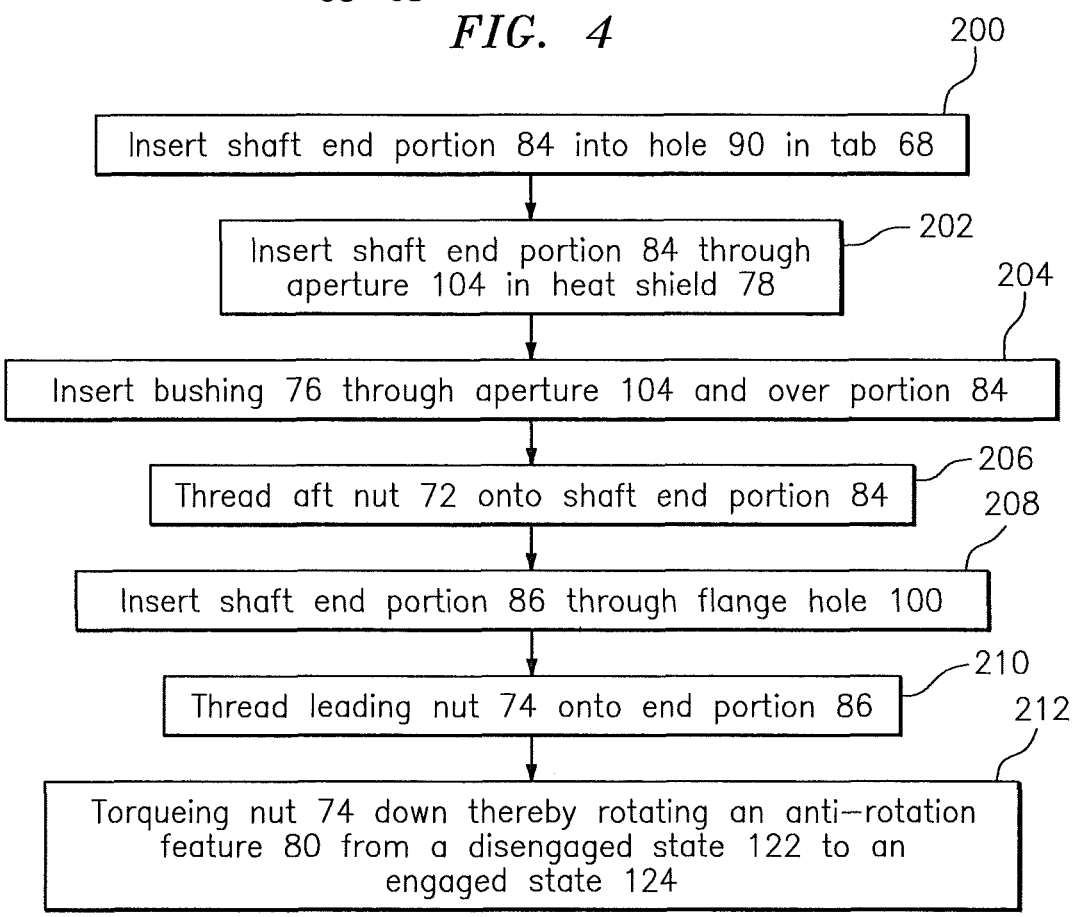
FIG. 5 is a flow chart illustrating an order of assembling the tie rod device.

During assembly of the alignment tie rod device 66 (see FIG. 5), and as step 200, the aft end portion 84 of the shaft 70 is inserted through the hole 90 in the tab 68 of the shroud segment 56 until the upstream anti-rotation feature 80 is generally in the channel 94. As step 202, the projecting aft end portion 84 is inserted through the aperture 104 in the heat shield 78. As step 204, the leading end of the bushing 76 may be inserted through the cover 108 and then into the aperture 104 in the heat shield 78. As step 206, the aft nut 72 may be threaded onto the distal end of the end portion 84.

As the aft nut 72 is tightened to a pre-determined torque in step 206, a leading end 110 of the bushing 76 is biased against an aft side 112 of the tab 68 and the aft end or bushing flange 106 is biased against the aft nut 72. An axial length of the bushing 76 may be sufficiently long such that the anti-rotation feature 80 is not biased or appreciably biased against the bottom portion 92 of the tab 68, and the cover 108 is not biased against the heat shield 78. Simultaneously (i.e. as the aft nut 72 is tightened), the anti-rotation feature 80 'reacts out' the applied torque to the nut 72 by contacting the opposed rims 88, 90 of the tab 68. More specifically, a flanking location 126A of a first arcuate edge 128 of the anti-rotation feature 80 may contact the rim 88 and a flanking location 130A of a diametrically opposite, second, arcuate edge 132 may contact the opposing rim 90 of the tab 68. As step 208, the leading end portion 86 of the shaft 70 may then be inserted through the hole 100 in the flange 58 and until an aft side 114 of the flange 58 contacts a leading side 116 of the tab 68 and through which the channel 94 communicates. As step 210, the leading end portion 86 may be inserted through a washer or axial spacer 118 and the leading nut 74 may be threaded onto the distal end of the projecting leading end portion 86.

Figure 7:
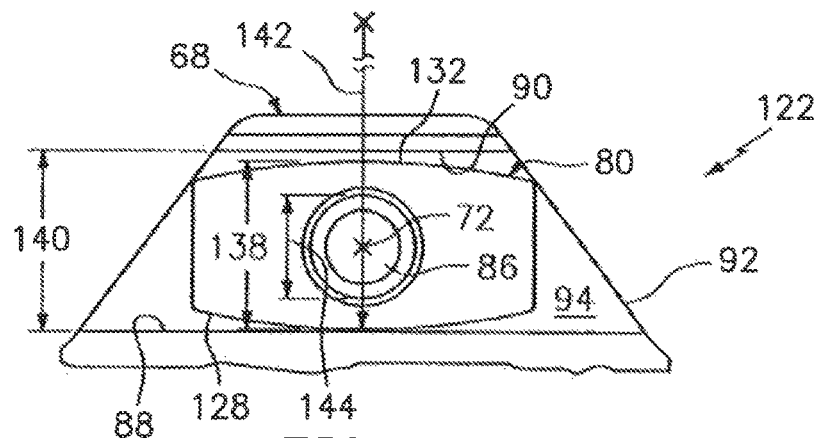
FIG. 7 is a plan view of the tie rod device with portion removed to show internal detail and illustrated in a disengaged state.
Figure 8:
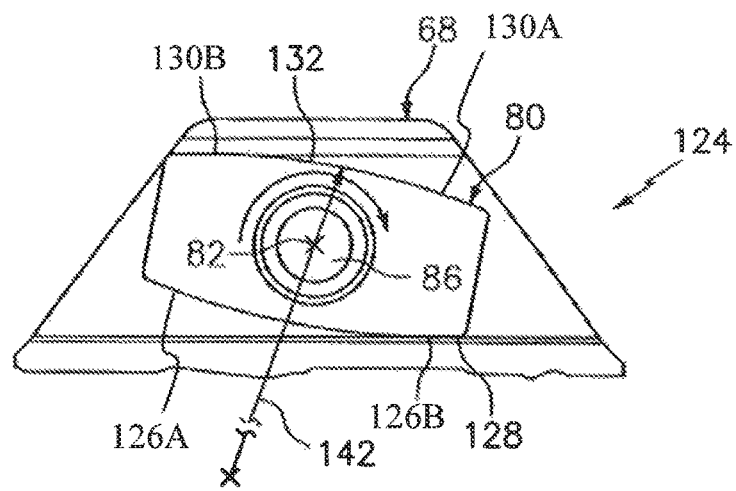
FIG. 8 is a plan view of the tie rod device with portion removed to show internal detail and illustrated in an engaged state.

As the leading nut 74 is tightened to a pre-determined torque in step 210, the aft side 114 of the flange 58 is biased against the leading side 116 of the tab 68, the leading nut 74 and/or spacer 118 is biased against a leading side 120 of the flange 58, and the anti-rotation feature 80 may rotate about the centerline 82 from the previously engaged position described in step 206, generally through a disengaged state 122 (see FIG. 7) and to an engaged state 124 (see FIG. 8). The anti-rotation feature 80 located within the channel 94 may not be biased against the aft side 114 of the flange 58, thereby allowing for limited rotational movement (i.e. between states 122, 124). More specifically and as step 212, which may occur simultaneously to step 210, a flanking location 126B of the first arcuate edge 128 of the anti-rotation feature 80 may contact the rim 88 and a flanking location 130B of a diametrically opposite, second, arcuate edge 132 may contact the opposing rim 90 of the tab 68 when in the engaged state 124.

As described in operation, both end portions 84, 86 of the shaft 70 may be commonly threaded (e.g. right hand threads). However, it is further contemplated and understood that the end portions 84, 86 may have opposite threads. In such an alternative embodiment, the anti-rotation feature 80 may generally rotate into the engaged state 124 when the first nut 72 is torqued onto the end portion 84, and the anti-rotation feature 80 may remain in the engaged state 124 when the second nut 74 is torqued onto the end portion 86 of the shaft 70.

Figure 6:
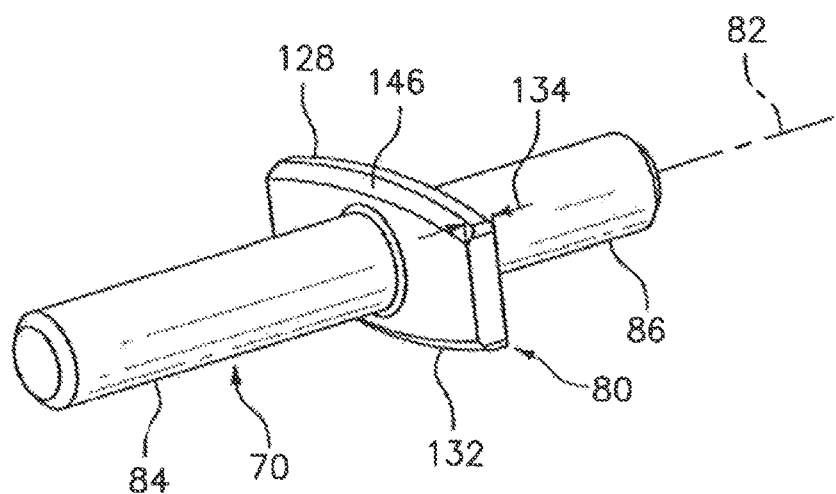
FIG. 6 is a perspective view of a shaft and anti-rotation feature of the tie rod device.

Referring to FIGS. 6 through 8, the dimensions and shape of the anti-rotation feature 80 are designed with respect to the materials used, dimensions of the shaft 70 and tab 68, and assembly torqueing requirements. Thus, the dimensions and shapes of the present disclosure not only facilitate the desired operation, but also prevent failure of the alignment tie rod device 66 and further prevent or minimize undesired scoring and/or plastic deformation between the edges 128, 132 of the anti-rotation feature 80 and the respective rims 88, 90 of the tab 68. In this light, the anti-rotation feature 80 may be substantially planar having an axial width (see arrow 134 in FIG. 6) that is slightly less than an axial depth (see arrow 136 in FIG. 4) of the channel 94 to facilitate, limited, rotational movement of the feature from the disengaged state 122 to the engaged state 124. A radial width (see arrow 138) of the feature 80 measured from and between the edges 128, 132 and through the centerline 82 is equal to or slightly less than a rim distance (see arrow 140) measured from and between the rims 88, 90 (i.e. the width of the channel 94).

The arcuate edges 128, 132 may each have a radius of curvature (see arrow 142) that may be substantially equal to one-another, and is substantially greater than the rim distance 140. A ratio of the rim distance 140 over the radius of curvature 142 may be equal to or less than about 0.28. With an established rim distance 140, the greater the radius of curvatures 142 for each edge 128, 132, the greater is the distance from the centerpoint 82 to the respective flanking, contact, locations 126A, 126B, 130A, 130B. The shaft 70 may have a diameter (see arrow 144) and a ratio of the diameter 144 over the radial width 138 of the feature 80 may be about 0.54. Each edge 128, 132 may further have a longitudinally extending chamfer 146 that generally faces the bottom portion 92 of the tab 68 and is sized to eliminate any sharp edges of the anti-rotation feature 80 from contacting the tab 68, and results in a reduction of contact area at each flanking location 126A, 126B, 130A, 130B.

As one, non-limiting, example, the alignment tie rod device 66 may be applied to the seventh stage 42 of the compressor section 24. The inner and outer shroud segments 56, airfoils 48 and tab 68 may be cast and/or machined as one unitary piece and may be made of Inconel 718. The shaft 70 and anti-rotation feature 80 may be cast and/or machined as one unitary piece and may be made with the same material as the tab (e.g. Inconel 718). The ring case 52 and flange 58 may be cast and/or machined as one unitary piece and may be made of a Titanium or Titanium alloy. The rim distance 140 may be about 0.463 inches (11.76 mm), and the radius of curvature 142 may be about 1.690 inches (42.93 mm). The diameter 144 of the shaft 70 may be about 0.250 inches (6.35 mm), and the radial width 138 of the feature 80 may be about 0.459 inches (11.66 mm). Manufacturing tolerances for all dimensions may be within about, plus or minus, 0.9 percent.

It is further contemplated and understood that the alignment tie rod device 66 may be utilized anywhere within the gas turbine engine 20 including, but not limited to, shrouds or endwalls of airfoil assemblies within the turbine section. Yet further, the device 66 may be applied in any application where the packaging and the order of assembly makes installations difficult. Therefore, the tab 68 may be any first structure connected to any component that may require alignment. Likewise, the flange 58 may be any second structure that may be connected to another component, and the heat shield 78 may be any third structure requiring support.

While the invention is described with reference to exemplary embodiment(s), it will be understood by those skilled in the art that various changes may be made and equivalents may be substituted without departing from the spirit and scope of the invention. Therefore, different modifications may be made to adapt the teachings of the invention to particular situations or materials, without departing from the essential scope. The invention is thus not limited to the particular examples and/or disclosed structures, but includes all embodiments falling within the scope of the appended claims, which scope is accorded the broadest interpretation so as to encompass all such modifications, equivalent structures and methods. Moreover, although particular step sequences may be shown, described, and claimed, it is understood that steps may be performed in any order, separated or combined unless otherwise indicated and will still benefit from the present disclosure. It is further understood that when the language "at least a portion," "a portion," and/or "at least in-part" is used in the claims, the item may include a portion and/or the entire item unless specifically stated to the contrary.

What is claimed is:

1. An alignment tie rod device comprising:
    a shaft extending along a centerline;
    a first structure including opposing first and second rims and a base portion spanning between the first and second rims with the base portion and the rims defining a channel in the first structure extending normal to the centerline, wherein a hole in the base portion communicates with the channel and is spaced from and centered between the first and second rims for receipt of the shaft, and the rims are spaced apart by a rim distance; and
    an anti-rotation feature rigidly engaged to the shaft and projecting radially outward in diametrically opposed directions, the anti-rotation feature having diametrically opposite arcuate first and second edges each having a radius of curvature and a longitudinally extending chamfer, and wherein a ratio of the rim distance over the radius of curvature is equal to or less than 0.28, wherein the first and second edges are joined to one another by third and fourth edges, wherein the third and fourth edges extend in a radial direction relative to the centerline, wherein a first flanking location of the first edge contacts the first rim and a second flanking location of the second edge contacts the second rim when the anti-rotation feature is rotated about the centerline from a disengaged state to an engaged state, wherein the first flanking location is laterally offset from the third edge relative to the centerline, and wherein the second flanking location is laterally offset from the fourth edge relative to the centerline and the anti-rotation feature has an axial width that is less than an axial depth of the channel to facilitate rotational movement of the anti-rotational feature from the disengaged state to the engaged state.

2. The alignment tie rod device set forth in claim 1, wherein the respective radius of curvatures for the first and second edges are equivalent.

3. The alignment tie rod device set forth in claim 2, wherein the shaft has opposite first and second end portions and the anti-rotation feature is axially disposed between the end portions.

4. The alignment tie rod device set forth in claim 1, wherein the first structure and the anti-rotation feature are made of the same material.

5. The alignment tie rod device set forth in claim 1, further comprising:

a second structure including a side in biased contact with the first and second rims and at least in-part exposed to the channel with a hole in the second structure communicating through the side for receipt of the shaft.

6. The alignment tie rod device set forth in claim 1, further comprising:

a second structure including a side in biased contact with the first and second rims and at least in-part exposed to the channel with a hole in the second structure communicating through the side for receipt of the shaft;

a first nut threadably engaged to a first end portion of the shaft that projects outward from the second structure opposite the first structure;

a bushing disposed about the shaft and in axially biased contact with the first structure opposite the second structure; and a second nut threadably engaged to a second end portion of the shaft opposite the first end portion and that projects outward from the bushing.

7. The alignment tie rod device set forth in claim 6, further comprising:

a third structure with an aperture through which the bushing and the shaft extend, and wherein the bushing has a radially outward projecting flange with the third structure located axially between the flange and the first structure, the third structure being in biased contact with the flange, and the second nut being in contact with the flange opposite the third structure.

* * * * *